United States Patent [19]

Berland

[11] 3,729,588

[45] Apr. 24, 1973

[54] TRANSISTORIZED AMPLIFIER

[75] Inventor: Ole Berland, Horsholm, Denmark

[73] Assignee: American Danish Oticon A/S (Aktienselskabet William Demant), Copenhagen, Denmark

[22] Filed: Dec. 29, 1969

[21] Appl. No.: 888,343

[30] Foreign Application Priority Data

Dec. 31, 1968 Great Britain....................61,958/68

[52] U.S. Cl.........................179/1 A, 330/25, 179/1 F

[51] Int. Cl...................................................H03f 1/30

[58] Field of Search...............................179/1 A, 1 F; 330/25, 26

[56] References Cited

UNITED STATES PATENTS

| | | | |
|---|---|---|---|
| 3,303,380 | 2/1967 | Kozikowski | 330/25 |
| 3,320,365 | 6/1967 | Auernheimer | 179/1 A |
| 3,457,519 | 7/1969 | Hellstrom | 330/25 |
| 3,519,946 | 7/1970 | Camezind | 330/25 |
| 3,096,487 | 7/1963 | Lee | 330/25 |
| 3,555,442 | 1/1971 | Gardner | 330/25 |
| 3,166,719 | 1/1965 | Wiencer | 330/25 |

*Primary Examiner*—Kathleen H. Claffy
*Assistant Examiner*—Douglas W. Olms
*Attorney*—Ralph E. Bucknam, Jesse D. Reingold and Robert R. Strack

[57] ABSTRACT

The present invention relates to a transistorized audio amplifier especially for hearing aid equipment having an input stage and an output stage with a sound reproducer in the output stage between the collector of the output transistor and one battery terminal and with negative DC feedback between the output stage and the input stage. The base-emitter diode of the input is connected in such a manner as to provide stabilization of the voltage drop across the sound reproducer.

7 Claims, 4 Drawing Figures

TRANSISTORIZED AMPLIFIER

Figure 1:
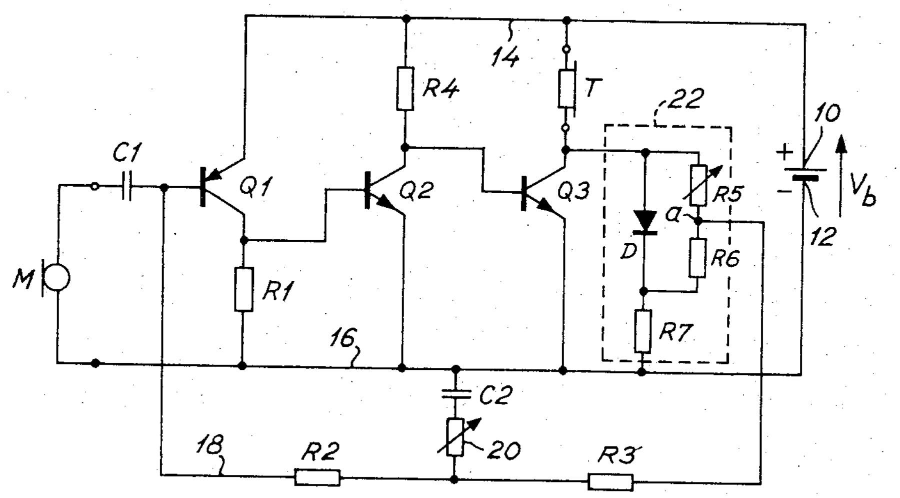

The present invention relates to a battery operated transistorized amplifier having an input stage with input between one terminal of the battery and the base of an input transistor and an output stage comprising a sound reproducer which is connected between one terminal of the battery and the collector of an output transistor and with negative DC feedback between the output transistor and the input transistor.

BACKGROUND OF THE INVENTION.

In amplifiers of the type here referred to the emitters of all the transistors of the amplification stages have been connected with the same terminal of the battery and the negative DC feedback has been provided through a plurality of resistors between the collector of the output transistor and the base of the input transistor and has substantially served to stabilize the collector-emitter voltage of the output transistor.

Hereby it is the collector voltage of the output transistor which has been stabilized by means of the negative feedback.

When using a normal mercury cell as voltage source with a voltage of approximately 1.3 volt and with a voltage drop across the sound reproducer being between 0.3 and 0.35 volt, which is normal in the case of most sound reproducers, the feedback should be adjusted in such a manner that the collector-emitter voltage is approximately 1 volt.

By using silicium transistors in which the voltage drop between base and emitter is approximately 0.55 volt the feedback should be adjusted in such a manner that to this voltage drop a further voltage drop of approximately 0.45 volt is added which is produced by means of the voltage drop across a resistor in the feedback line, caused by the base currents of the input transistor. Hereby the stabilizing does not become perfect and it has been found that there is substantial variations of the DC current through the sound reproducer in response to variations of the battery voltage as well as in response to temperature variations.

SUMMARY OF THE INVENTION

It is the purpose of the invention to avoid these drawbacks and to provide a circuit which enables a reduction of these variations.

It is a further purpose of the invention to provide a circuit in which variations in response to battery voltage is reduced to such an extent that there is no remarkable difference in sound reproduction within variations of battery voltage between fully charged battery and nearly worn out battery.

According to the invention the emitter of the base-emitter diode of the input transistor is connected with the same battery terminal as the sound reproducer. Thereby the feedback maintains the collector potential of the output transistor relatively to that battery terminal which is connected with the emitter of the input transistor.

This improves the stabilizing effect of the feedback and results therein that it is now the voltage drop across the sound reproducer which represents an ohmic resistance against the DC which is stabilized whereby the current through the sound reproducer remains substantially constant.

Since it is the collector of the output transistor which is connected with the same battery terminal as the emitter of the input transistor, the input transistor and the output transistor must be of opposite polarity.

The use of transistors of opposite polarity can be further utilized in amplifiers according to the invention thereby that in a multistage amplifier the transistor following a preceding stage is of opposite polarity and is connected with its base-emitter diode shunted across the collector resistor of the preceding stage whereby the voltage across this resistor is kept constant which contribute to keeping the collector current of the preceding transistor substantially constant so as to thereby increase the stabilization of the amplifier.

Figure 2:
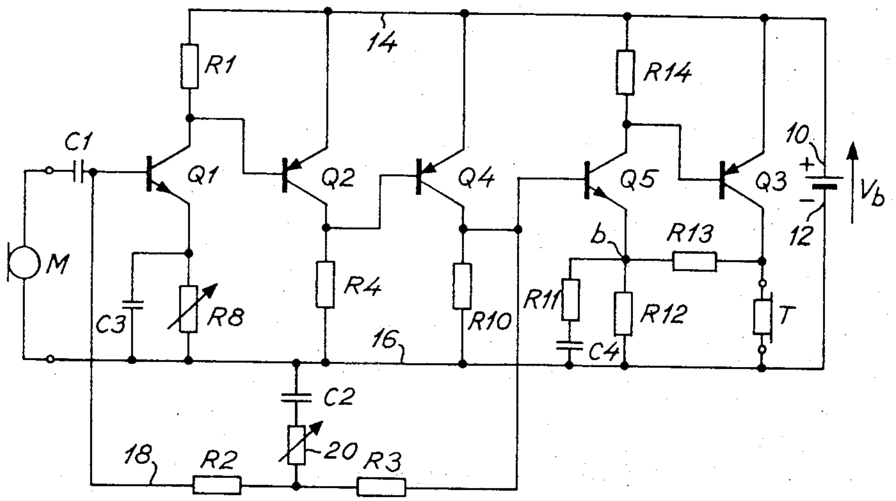
Figure 3:
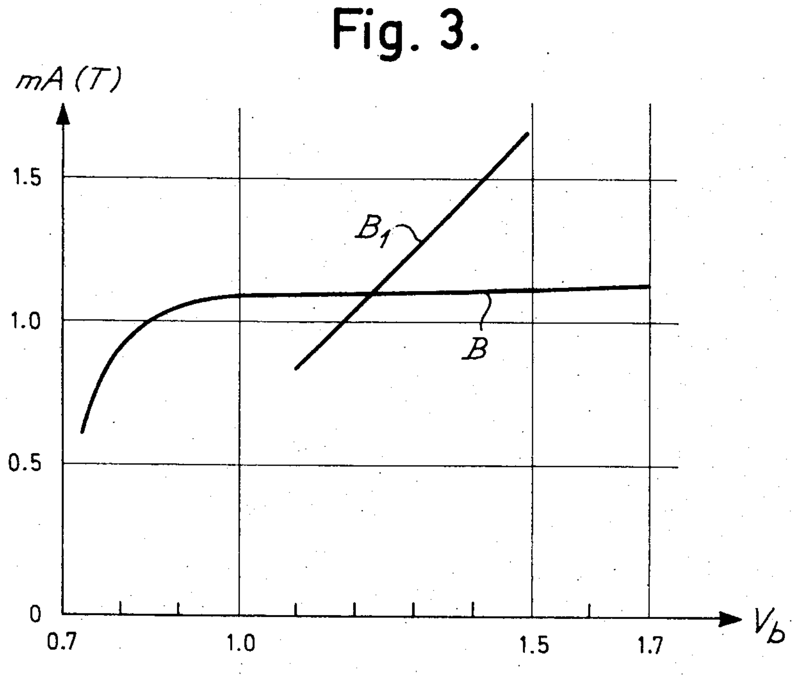

The invention will be further described in the following with reference to the accompanying drawing in which FIG. 1 is a diagrammatic illustration of an amplifier according to the invention in one embodiment, FIG. 2 is a diagrammatic illustration of an amplifier according to the invention in another embodiment, FIG. 3 illustrates curves showing the current through the sound reproducer as a function of the battery voltage, and FIG. 4 curves showing the current through the sound reproducer as a function of the temperature.

The amplifier shown in FIG. 1 includes three amplification steps with three transistors $Q_1$, $Q_2$ and $Q_3$ with a negative DC feedback from the output stage $Q_3$ to the input stage $Q_1$ through resistors $R_2$ and $R_3$.

In the drawing $V_b$ is a voltage source in the form of a battery with a positive terminal 10 and a negative terminal 12 from which a current supply leads 14 and 16 provide connections to the three transistors $Q_1$, $Q_2$ and $Q_3$.

At the collector side of the input transistor $Q_1$ a collector resistor $R_1$ is provided. The transistor $Q_1$ is of one polarity and the two other transistors $Q_2$ and $Q_3$ are of opposite polarity. In the embodiment shown the transistor $Q_1$ is a PNP-type transistor, and the transistors $Q_2$ and $Q_3$ are NPN-type transistors. Between the supply lead 14 and the collector of the transistor $Q_2$ a collector resistor $R_4$ is connected and between the supply lead 14 and the collector of the transistor $Q_3$ a sound reproducer T is connected.

At the input a transducer which normally will be in the form of a microphone M in series with a condensor $C_1$ is connected between the supply leads 16 and the base of the transistor $Q_1$.

The feedback line which is referred to by 18 provides in normal manner for stabilization of the circuit, thereby that the voltage drop across the base-emitter diode of the input transistor $Q_1$, which at a silicium transistor is about 0.55 volt is used as a reference voltage.

In the embodiment of FIG. 1 the feedback line is, however, not connected directly with the collector of the output transistor. In the circuit of the output transistor a network 22 is provided comprising a diode D in series with a resistor $R_7$ and the diode is shunted with a voltage divider comprising two resistors $R_5$ and $R_6$. One of these resistors in the embodiment shown the resistor $R_5$ is adjustable and the feedback line is connected to a point a between the two resistors $R_5$ and $R_6$.

During normal working conditions the voltage difference between the base of the input transistor $Q_1$ and the positive supply line 14 is approximately 0.55 volt, and if the voltage drop across the resistors $R_2$ and $R_3$ can be neglected, the voltage between the point *a* and the positive supply line 14 is also approximately 0.55 volt. The voltage drop across the sound reproducer is approximately 0.35 volt and by adjusting the resistor $R_5$ the voltage drop between the point *a* and the line 14 can be adjusted to about 0.55 volt corresponding to the voltage drop across the base-emitter diode of the input transistor.

By using a silicium diode as the diode D the voltage drop across this diode is substantially equal to 0.55 volt and the voltage divider $R_5$, $R_6$ must therefore be designed to divide this voltage drop approximately in the ratio 2:3.

The values of the resistors $R_2$, $R_3$, $R_5$ and $R_6$ are chosen relatively small so that the base current of the input transistor $Q_1$ which varies with the DC amplification factor of this transistor will not cause any substantial voltage drop across these resistors. It is therefore possible in practice to use the voltage $R_5$ to compensate for the stray in voltage drop across the diode D as well as the stray in voltage across the base-emitter diode of the transistor $Q_1$.

As obvious from the foregoing description the circuit according to the invention provides for a substantially constant current through the sound reproducer. Due to the low values of the resistors in the feedback line and the low values of the other resistors the voltage drops are of no substantial importance whereby the stabilizing effect is substantially increased in comparison with the known circuits.

The collector current through the input transistor $Q_1$ is maintained at a relatively low value, a.o. to keep the noise level low and is in addition kept substantially constant independent of variations of the battery voltage. As apparent from FIG. 1, the transistors $Q_2$ and $Q_3$ are opposite polarity type of the transistor $Q_1$ and the base-emitter diode of the transistor $Q_2$ is shunted across the collector resistor $R_1$ of the input transistor $Q_1$ whereby the current through this resistor is kept substantially constant, determined by the voltage drop across the base-emitter diode of the transistor $Q_2$.

In as far as the currents through the transistors $Q_1$ and $Q_3$ are kept substantially constant, this also means that the AC amplification in these two stages is kept substantially constant.

In FIG. 1 a condensor $C_2$ is shunted between the negative supply lead 16 and the feedback line 18. In order to provide for volume control a variable impedance or resistor 20 can be provided in series with this condensor, but it will be understood that as volume control it is also possible in wellknown manner to provide a variable impedance parallel with one of the collector resistors of one of the preceding amplification stages.

In the embodiment of FIG. 2 a circuit is shown having five amplification stages of which the intermediates are referred to by $Q_4$ and $Q_5$. The various leads and other components are referred to by the same reference numerals as in FIG. 1.

In the embodiment of FIG. 2 the transistors are inverted and of opposite polarity in comparison with the circuit of FIG. 1. The transistor $Q_1$ is an NPN-transistor, the emitter of which is connected with the negative supply lead and the output transistor $Q_3$ is a PNP-transistor, the collector of which through the sound reproducer T is connected with the negative supply lead.

The second amplification stage $Q_2$ is a PNP-transistor, the collector of which over a resistor $R_4$ is connected with the negative supply lead. The transistor $Q_4$ is a PNP-transistor, the collector of which through a resistor $R_{10}$ is connected with the negative supply lead.

The transistor $Q_5$ is an NPN-transistor, the collector of which through a resistor $R_{14}$ is connected with the positive supply lead, and in the emitter circuit of which a network is connected which will be explained in more detail in the following and which is also connected in the collector circuit of the output transistor $Q_3$.

In the emitter circuit of the input transistor $Q_1$ a variable resistor $R_8$ is connected shunted by a condensor $C_3$ which prevents such AC feedback which otherwise would result through the resistor $R_8$.

The network which is connected with the last two stages $Q_5$ and $Q_3$ comprises a resistor $R_{13}$ which is connected with the collector of the output transistor $Q_3$ and the other end of which is connected with the emitter of the transistor $Q_5$ which is branched to the negative supply lead 16 through a resistor $R_{12}$ as well as through a series connections of a resistor $R_{11}$ and a condensor $C_4$.

The resistors $R_{12}$ and $R_{13}$ constitute a voltage conversion network and by suitable choice of the values of these resistors the voltage drop across the resistor $R_{12}$ can be adjusted to a suitable fraction of the voltage drop across the base-emitter diode of the transistor $Q_5$, e.g. one fifth of this voltage drop such as approximately 0.10 volt.

As illustrated in FIG. 2 the feedback line 18 is connected with the base of the transistor $Q_5$ as well as with the collector of the transistor $Q_4$. The potential difference between the base of the transistor $Q_5$ and the point *b* is approximately 0.55 volt, supposing that the transistor is a silicium transistor. Thereby the potential difference between the base of the transistor and the negative supply lead would be approximately 0.65 volt.

As in the case of FIG. 1 it is not desirable to have a substantial voltage drop across the resistors $R_2$ and $R_3$ in the feedback line and it is, therefore, also necessary that the voltage drop of 0.65 volt is available between the base of the transistor $Q_1$ and the negative supply lead.

This is obtained thereby that the voltage drop over the resistor $R_8$ which can be regulated is added to the voltage drop of approximately 0.55 volt across the base-emitter diode of the input transistor so that this voltage drop can be regulated to be the same as the voltage between the base of the transistor $Q_3$ and the negative supply lead. The feedback thereby maintains the potential between the base of the transistor $Q_5$ and the negative supply lead constant.

By regulating these voltage conditions, using the resistor $R_8$ and in connection with the voltage regulating network it is possible to adjust the collector voltage of the output transistor $Q_3$ and thereby the current through the sound reproducer to a desired constant value and it is also possible to adjust for the stray of the base-emitter voltages of the transistors $Q_1$ and $Q_4$.

As in the case of FIG. 1 it is the base emitter voltage of the input transistor $Q_1$ which is used as a reference voltage.

In FIG. 2 it is the base-emitter diode of the transistor $Q_5$ which is equivalent with the diode D of FIG. 1 and is a part of the voltage regulating network. The base-emitter voltage drop of this transistor is together with the constant base voltage the reference value, namely the voltage of the point *b* which is a reference voltage of the network.

As in the case of FIG. 1 the shunting of the collector resistor $R_1$ of the input transistor $Q_1$ with the emitter-base diode of the transistor $Q_2$ causes the collector current of the input transistor $Q_1$ to be kept constant.

The resistor $R_{11}$ in series with the condensator $C_4$, the impedance of which is small compared with the resistor $R_{11}$ causes together with the resistors $R_{12}$ and $R_{13}$ a negative AC feedback over the two last amplification stages.

Figure 4:
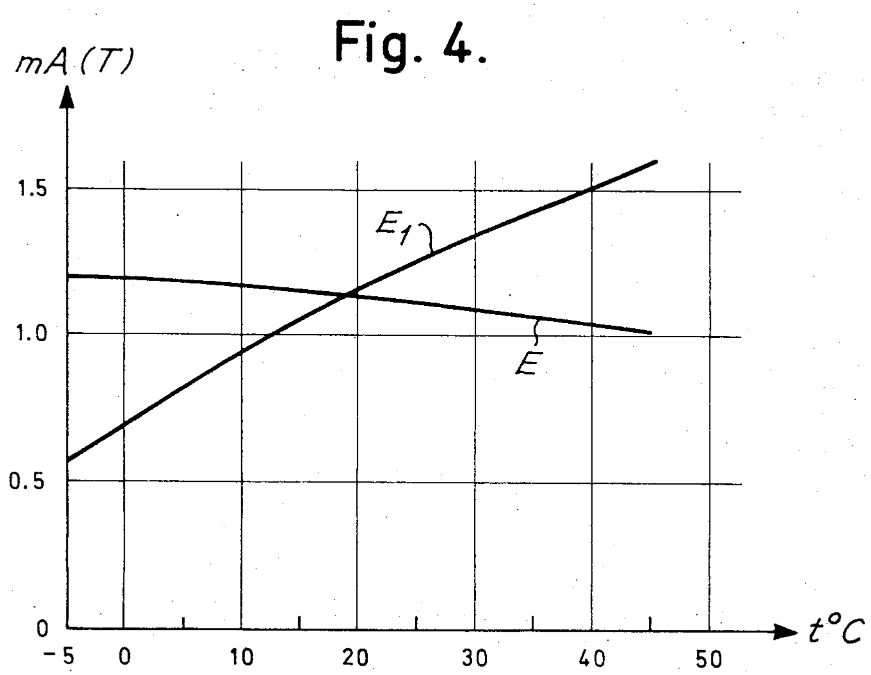

The advantages with respect to temperature stabilization and independence of the battery voltage which are obtained according to the invention appears from the curves of FIG. 3 and 4.

In these figures the curves $B_1$ and $E_1$ illustrate the current through the sound reproducer as a function of the battery voltage and temperature respectively in a traditional amplifier which differs from the embodiment of FIG. 1 thereby that the network 22 is omitted and all the transistors are of the same type with their emitters connected with the same battery terminal.

The curves B and E are corresponding curves for the amplifier of FIG. 2.

In FIG. 3 the curves $B_1$ and B show the DC current through the sound reproducer as a function of the battery voltage. As clearly appears from these curves the current through the sound reproducer of an amplifier of the traditional type varies substantially as a function of the battery voltage so that the current is reduced to approximately half of the value when the battery voltage has dropped from about 1.5 volt to 1.1 volt. In the amplifier according to the invention, however, the current through the sound reproducer remains constant between a battery voltage of approximately 1.7 volt down to a battery voltage below 1 volt which means that with an amplifier according to the invention it is possible to use the batteries substantially longer, practically until they are completely worn out.

In a corresponding manner it appears from FIG. 4 that while in a traditional amplifier the current through the sound reproducer is substantially dependent of the temperature and increases with the temperature, an amplifier according to the invention is substantially independent of the temperature which is of importance with the hearing aids which during different seasons are used at highly varying temperatures.

It would be understood that the invention is not limited to the embodiments illustrated and described hereinbefore. By way of example it is possible within the scope of the invention in the embodiment of FIG. 1 instead of one PNP-transistor and two NPN-transistors to use one NPN-transistor and two PNP-transistors, provided that the polarity of the battery and the diode D is inverted.

It will also be appreciated that the stabilizing principles of the invention by using suitable phase converting circuits can be used to construct a Push-Pull amplifier.

I claim:

1. In a battery operated amplifier with transistors having an input stage with an input between one terminal of a battery and the base of an input transistor and an output having a sound reproducer connected between one terminal of the battery and the collector of an output transistor, and with negative DC feedback path between the output transistor and the input transistor, the improvement comprising the emitter of the base-emitter diode of the input transistor being connected with the same battery terminal as the sound reproducer so that the feedback maintains the collector potential of the output transistor relatively constant with respect to the potential at the battery terminal connected with the emitter of the input transistor; and a voltage adjusting network between the collector of the output transistor and the feedback path to compensate for the DC voltage difference between the output and input of the amplifier, comprising a diode in series with a resistor connected between the collector of the output transistor and the emitter thereof and shunted with an adjustable voltage divider having a point at which the feedback path is connected, the voltage of the point being adjustable to a value which added to the voltage drop across the sound reproducer is substantially equal to the voltage drop between the base and emitter of the input transistor.

2. An amplifier as claimed in claim 1 in which the diode is a silicium diode.

3. An amplifier as claimed in claim 1 in which the feedback path includes resistors which are of so low value that the base currents of the input transistor only cause a small voltage drop across these resistors.

4. An amplifier as claimed in claim 1 in which the voltage adjusting network includes resistors which are of low values.

5. In a battery operated amplifier with transistors having an input stage with an input between one terminal of the battery and the base of an input transistor and an output stage having a sound reproducer which is connected between one terminal of the battery and the collector of an output transistor and with a negative feedback path between the output transistor and the input transistor the improvement that the input transistor and the output transistor are of opposite polarity with the emitter of the input transistor connected to the same battery terminal as that to which the collector of the output transistor is connected through the sound reproducer, a voltage adjusting network between the collector of the output transistor and the feedback path to compensate for the DC voltage difference between the output and input of the amplifier, comprising a diode in series with a resistor shunted with an adjustable voltage divider having a point at which the feedback path is connected, the voltage of the point being adjustable to a value which added to the voltage drop across the sound reproducer is substantially equal to the voltage drop between the base and emitter of the input transistor.

6. An amplifier as claimed in claim 5 in which the diode is a silicium diode.

7. In a battery operated amplifier with transistors having an input stage with an input between one terminal of the battery and the base of an input transistor and an output stage having a sound reproducer which is connected between one terminal of the battery and the collector of an output transistor, and with a negative feedback path between the output transistor and the input transistor, the improvement that the input transistor and the output transistor are of opposite polarity with the emitter of the input transistor connected with the same battery terminal as that with which the collector of the output transistor is connected through the sound reproducer, a voltage adjusting network provided between the collector of the output transistor and the feedback path to compensate for the DC voltage difference between the output and input of the amplifier, said voltage adjusting network comprising a diode having substantially constant voltage drop which at least partially is used to compensate for the voltage difference between the output and input of the amplifier, said diode being a base emitter diode of a transistor which constitutes an amplification stage between the input stage and the output stage and to the base of which the negative feedback path from the input stage is connected and in series with which a resistor is provided in a voltage adjusting network which is connected with the sound reproducer and the collector of the output transistor.

* * * * *